(12) United States Patent
Sheridan

(10) Patent No.: US 10,767,753 B2
(45) Date of Patent: Sep. 8, 2020

(54) ROLLING ELEMENT CAGE FOR GEARED TURBOFAN

(71) Applicant: United Technologies Corporation, Farmington, CT (US)

(72) Inventor: William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 744 days.

(21) Appl. No.: 15/132,650

(22) Filed: Apr. 19, 2016

(65) Prior Publication Data

US 2016/0377167 A1 Dec. 29, 2016

Related U.S. Application Data

(60) Provisional application No. 62/184,286, filed on Jun. 25, 2015.

(51) Int. Cl.

| F16H 57/04 | (2010.01) |
|---|---|
| F16H 57/08 | (2006.01) |
| F02C 3/107 | (2006.01) |
| F16C 33/66 | (2006.01) |
| F02K 3/02 | (2006.01) |
| F16H 1/28 | (2006.01) |
| F16C 19/26 | (2006.01) |

(52) U.S. Cl.
CPC ......... *F16H 57/0479* (2013.01); *F02C 3/107* (2013.01); *F02K 3/02* (2013.01); *F16C 33/6677* (2013.01); *F16H 1/28* (2013.01); *F16H 57/043* (2013.01); *F16H 57/0427* (2013.01); *F16H 57/0456* (2013.01); *F16H 57/0471* (2013.01);

(Continued)

(58) Field of Classification Search
CPC ............. F16H 57/0479; F16H 57/0471; F16H 57/0427; F16H 57/043; F16H 57/0456; F16H 57/0486; F16H 57/082; F16H 2057/085; F16H 1/28; F02C 3/107; F02C 7/06; F02C 7/36; F02K 3/02; F02K 3/06;
(Continued)

(56) References Cited

U.S. PATENT DOCUMENTS 5,107,676 A 4/1992 Hadaway et al.
5,472,383 A 12/1995 McKibbin
(Continued)

FOREIGN PATENT DOCUMENTS

EP 2559914 A1 2/2013

OTHER PUBLICATIONS

European Search Report for EP Application No. 16176058.2 dated Jan. 18, 2017.

*Primary Examiner* — Mark A Laurenzi
*Assistant Examiner* — Loren C Edwards
(74) *Attorney, Agent, or Firm* — Carlson, Gaskey & Olds, P.C.

(57) ABSTRACT

A gear system for a turbofan engine assembly includes a sun gear rotatable about an engine centerline, a non-rotatable ring gear, and a rotating carrier that drives a fan. A plurality of planet gears is intermeshed between the sun gear and the ring gear. A rolling element bearing assembly supports rotation of the planet gear on the carrier. The rolling element bearing assembly includes a rolling element between an inner race and an outer race separated by a cage. A first passage for lubricant through the planet gear. A second passage is in communication with the first passage for communicating lubricant through the inner race to an interface between the inner race and the cage. A geared turbofan engine is also disclosed.

15 Claims, 4 Drawing Sheets

(52) U.S. Cl.
CPC ....... *F16H 57/0486* (2013.01); *F16H 57/082* (2013.01); *F05D 2260/40311* (2013.01); *F05D 2260/98* (2013.01); *F16C 19/26* (2013.01); *F16C 2360/23* (2013.01); *F16H 2057/085* (2013.01)

(58) Field of Classification Search
CPC ....... F05D 2260/40311; F05D 2260/98; F05D 2057/085; F01D 25/18; F01D 25/16
USPC ....................................................... 60/226.1
See application file for complete search history.

(56) References Cited

U.S. PATENT DOCUMENTS

| | | | | |
|---|---|---|---|---|
| 5,685,797 | A * | 11/1997 | Barnsby | F16C 33/12 384/625 |
| 6,036,995 | A * | 3/2000 | Kircher | C23C 10/60 427/142 |
| 8,523,725 | B2 | 9/2013 | Torii et al. | |
| 8,640,336 | B2 | 2/2014 | Sheridan et al. | |
| 8,813,469 | B2 | 8/2014 | Sheridan | |
| 8,820,478 | B2 | 9/2014 | Gauthier et al. | |
| 8,898,900 | B2 | 12/2014 | Sheridan et al. | |
| 8,939,864 | B2 | 1/2015 | McCune et al. | |
| 9,194,432 | B2 * | 11/2015 | Ashmore | F16C 33/6614 |
| 2003/0099540 | A1 * | 5/2003 | Feest | F02C 7/277 415/122.1 |
| 2013/0087413 | A1 * | 4/2013 | Carter | F16C 33/6677 184/6.11 |
| 2013/0095974 | A1 * | 4/2013 | Imai | F16H 57/0479 475/159 |
| 2014/0155213 | A1 * | 6/2014 | Sheridan | F02C 7/36 475/159 |

\* cited by examiner

ROLLING ELEMENT CAGE FOR GEARED TURBOFAN

CROSS REFERENCE TO RELATED APPLICATION

This application claims priority to U.S. Provisional Application No. 62/184,286 filed Jun. 25, 2015.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear system may be utilized to drive the fan section such that the fan section may rotate at a speed different than the turbine section so as to increase the overall propulsive efficiency of the engine. The high rotational speeds encountered by such gear systems require provisions for lubrication during all operating conditions to provide desired operation and durability.

SUMMARY

In a featured embodiment, a gear system for a turbofan engine assembly includes a sun gear rotatable about an engine centerline, a non-rotatable ring gear, and a rotating carrier that drives a fan. A plurality of planet gears is intermeshed between the sun gear and the ring gear. A rolling element bearing assembly supports rotation of the planet gear on the carrier. The rolling element bearing assembly includes a rolling element between an inner race and an outer race separated by a cage. A first passage for lubricant through the planet gear. A second passage is in communication with the first passage for communicating lubricant through the inner race to an interface between the inner race and the cage.

In another embodiment according to the previous embodiment, each of the plurality of planet gears includes an inner cavity and the first passage is in communication with the inner cavity and the planet gear further includes a third passage through the planet gear that directs lubricant toward the rolling element bearing.

In another embodiment according to any of the previous embodiments, the carrier includes an outer scoop that receives lubricant from an outer fixed lubricant jet and feeds lubricant into the inner cavity and through the first lubricant passage, the second passage and the third passage to provide lubricant to the roller element bearing assembly.

In another embodiment according to any of the previous embodiments, the carrier includes an inner scoop that receives lubricant from an inner fixed lubricant jet and feeds lubricant through the carrier to a spray bar. The spray bar sprays lubricant into at least one of the gear interfaces between the planet gear, the sun gear and the ring gear.

In another embodiment according to any of the previous embodiments, the rolling element bearing is one of a ball, roller, tapered roller and spherical roller element.

In another embodiment according to any of the previous embodiments, the cage includes at least one of a steel and a steel alloy.

In another embodiment according to any of the previous embodiments, the cage is plated within at least one of silver, nickel and gold.

In another embodiment according to any of the previous embodiments, the inner race includes guide rails coated with at least one of Tungsten Carbide, Titanium Nitride, Chrome and Chrome Carbide alloy.

In another embodiment according to any of the previous embodiments, the inner race includes guide rails. The guide rails include a surface interface with the cage. The surface interface includes a machine surface finish of at least 16 micro-inches.

In another featured embodiment, a geared turbofan engine includes a fan configured to drive air along a bypass flow path. A compressor section is configured to communicate compressed air to a combustor section for generating a high energy gas flow for driving a turbine section where energy is extracted and utilized to drive the compressor section and the fan. A gear system is driven by the turbine section for driving the fan. The gear system includes a sun gear rotatable about an engine centerline, a non-rotatable ring gear, and a rotating carrier that drives the fan. A plurality of planet gears are intermeshed between the sun gear and the ring gear. A rolling element bearing assembly supports rotation of the planet gear on the carrier. The rolling element bearing assembly includes a rolling element between an inner race and an outer race separated by a cage. A first passage for lubricant through the planet gear, and a second passage for lubricant through the inner race to provide lubricant to an interface between the inner race and the cage.

In another embodiment according to the previous embodiment, each of the plurality of planet gears includes an inner cavity with the first passage in communication with the inner cavity and the planet gear further includes a third passage through the planet gear for directing lubricant toward the rolling element bearing.

In another embodiment according to any of the previous embodiments, the carrier includes an outer scoop that receives lubricant from an outer fixed lubricant jet and feeds lubricant into the inner cavity and through the first lubricant passage, the second lubricant passage and the third passage to provide lubricant to the roller element bearing assembly.

In another embodiment according to any of the previous embodiments, the carrier includes an inner scoop that receives lubricant from an inner fixed lubricant jet and feeds lubricant through the carrier to a spray bar. The spray bar sprays lubricant into at least one of the gear interfaces between the planet gear, the sun gear and the ring gear.

In another embodiment according to any of the previous embodiments, the inner race includes guide rails coated with at least one of Tungsten Carbide, Titanium Nitride, Chrome and Chrome Carbide alloy.

In another embodiment according to any of the previous embodiments, the inner race includes guide rails including a surface interface with the cage. The surface interface includes a machine surface finish of at least sixteen (16) micro-inches.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
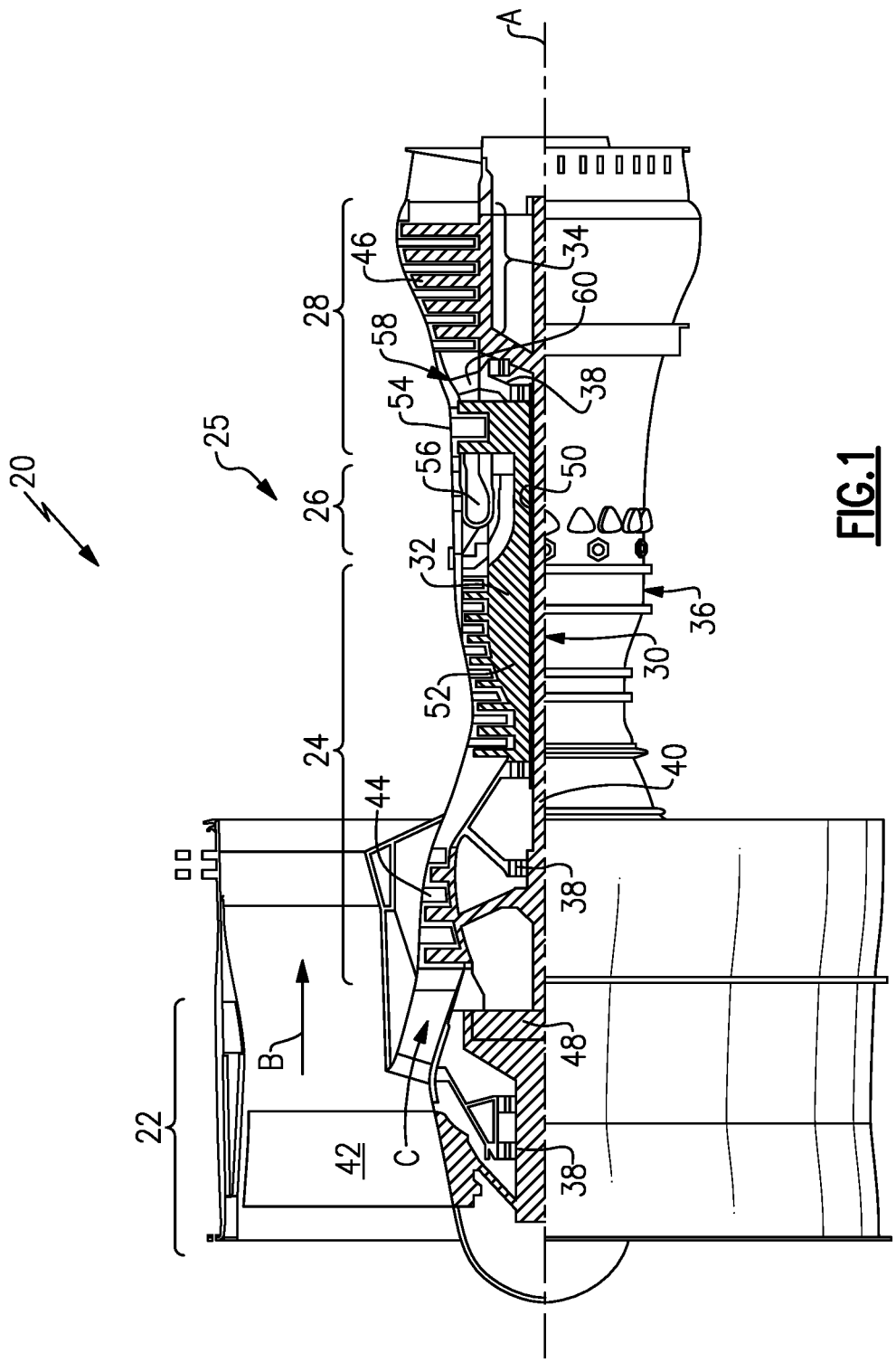
FIG. 1 schematically shows an embodiment of a gas turbine engine.

FIG. 1 schematically illustrates an example gas turbine engine 20 that includes a fan section 22 and a core engine section 25. The core engine section 25 includes a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a gear system 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46. Although the example engine embodiment includes a mid-turbine frame 58, it is within the contemplation of this disclosure to include a turbine section 28 without a mid-turbine frame 58.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vane rows or states in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example gear system 48 is an epicyclical gear train, such as a planetary gear system, star gear system or other known gear system, with a gear reduction ratio of greater than about 3:1.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

Fan pressure ratio is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

Corrected fan tip speed is the actual fan tip speed in ft/sec divided by an industry standard temperature correction of $[(Tram\ °\ R)/(518.7°\ R)]^{0.5}$. The corrected fan tip speed, as disclosed herein according to one non-limiting embodiment, is less than about 1150 ft/second. The low fan pressure ratio and fan tip speed are applicable throughout all operational phases of the gas turbine engine and at least at the bucket cruise thrust specific fuel consumption operating conditions.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
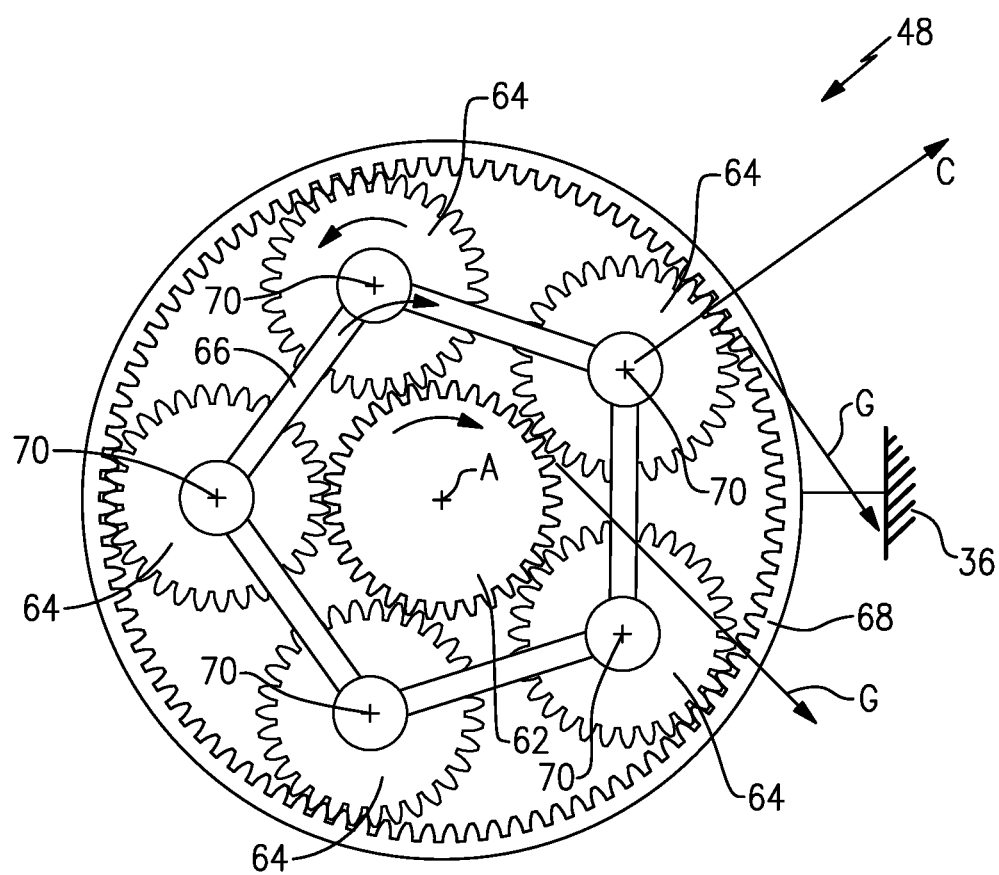
FIG. 2 schematically shows an embodiment of gear system for a gas turbine engine.

Referring to FIG. 2, with continued reference to FIG. 1, a disclosed embodiment of the gear system 48 includes a sun gear 62 rotatable about the engine axis A by the inner shaft 40. The sun gear 62 drives a plurality of planet gears 64 circumscribed by a fixed ring gear 68. The planet gears 64 are supported in a carrier 66 that rotates about the engine axis A. Each of the planet gears 64 rotate about separate axes 70.

Figure 3:
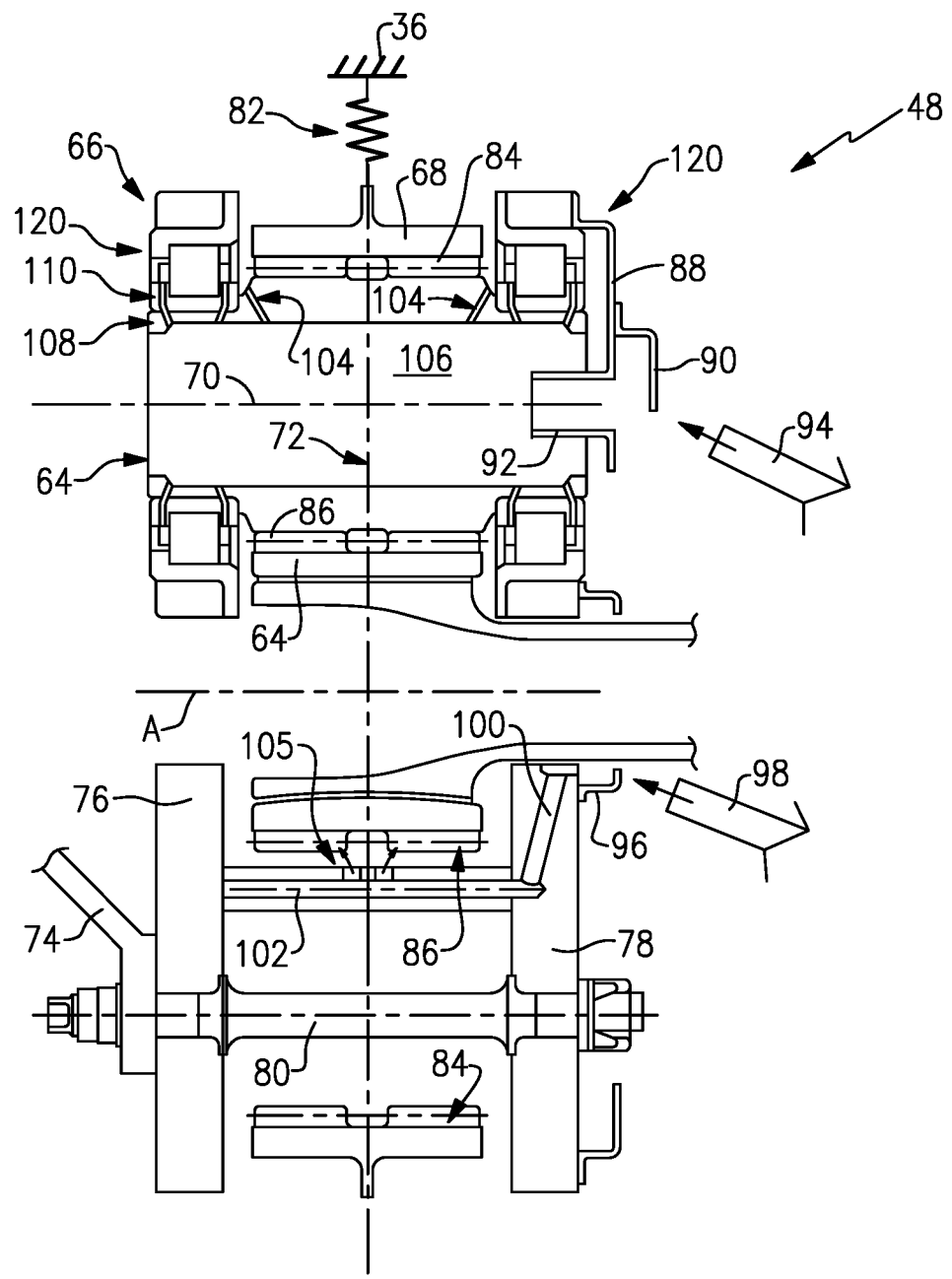
FIG. 3 schematically shows a section of an embodiment of the gear system.

Referring to FIG. 3 with continued reference to FIG. 2, each of the planet gears 64 is supported on rolling element bearing assemblies 120. Because the carrier 66 is rotating, the bearing assemblies 120 experience gear loads, schematically shown at arrow G, and centrifugal loads, schematically shown as arrow C, of the rotating gear mass. The gear load G and centrifugal load C are added by vector summation and are applied to the bearing assemblies as a total load. The example gear system 48, with the rotating carrier, rotates more than 2500 rpm. Such speeds can generate total loads much higher than those typically encountered by rolling element bearing assemblies.

Figure 4:
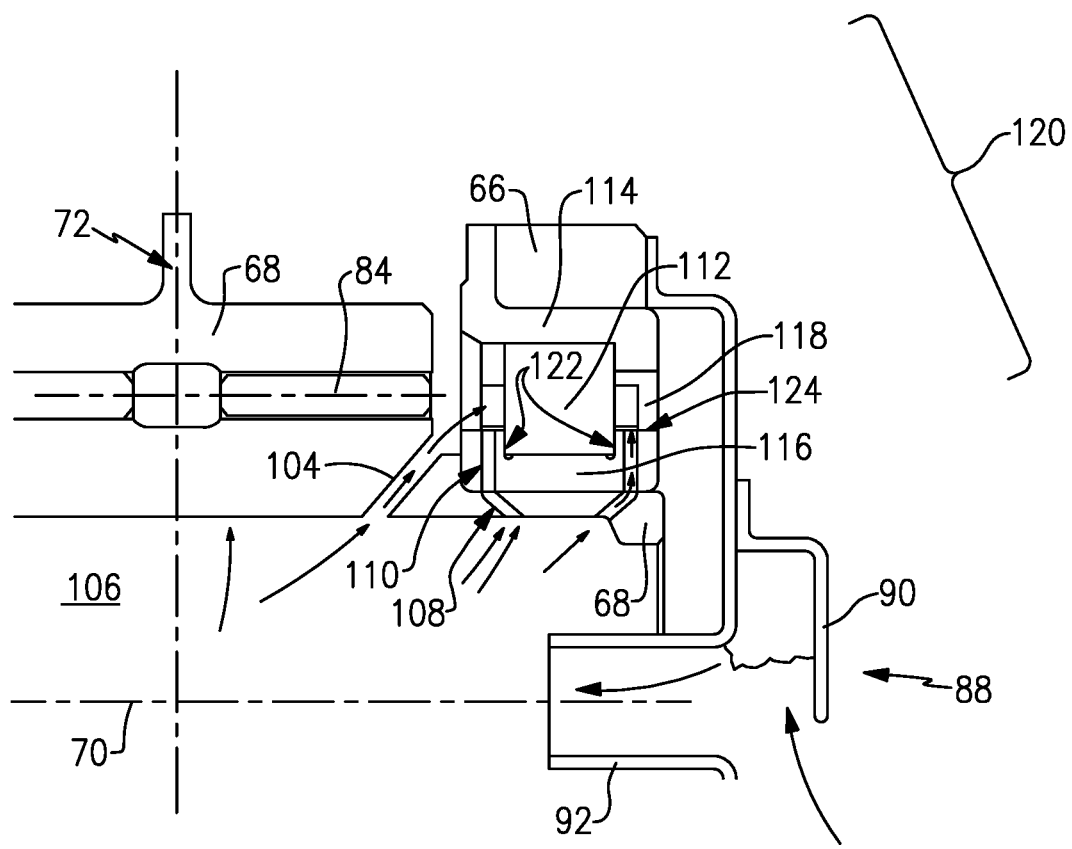
FIG. 4 schematically shows an enlarged section of an embodiment of the gear system.

Referring to FIGS. 3 and 4, a disclosed gear system embodiment 48 includes the carrier 66 that supports the planet gears 64 and drives a fan shaft 74. The ring gear 68 is fixed to the static engine structure 36 through a flex mount 82. The sun gear 62, planet gears 64 and ring gear 68 are all centered along a gear centerline 72 to provide a single stage gear system 48.

The disclosed carrier 66 includes a forward plate 76 that is attached to an aft plate 78 by fasteners 80. An inner scoop 96 receives lubricant (such as oil) from a fixed inner lubricant jet 98. An outer scoop 88 receives lubricant from an outer lubricant jet 94. The inner lubricant scoop 96 communicates lubricant through passages 100 within the carrier 66 to a spray bar 102. The spray bar 102 sprays lubricant, via radial passages 105, into a gear interface 84 between the planet gears 64 and/or the ring gear 68 and a gear interface 86 between the planet gears 64 and the sun gear 62.

The planet gear 64 includes an inner cavity 106 disposed about the axis 70. Lubricant is communicated into the internal cavity 106, in this example embodiment through the outer scoop 88. The outer scoop 88 catches lubricant directed from an outer fixed lubricant jet 94. Lubricant from the fixed lubricant jet 94 is caught and accumulated within an accumulator portion 90 of the outer scoop 88. In the accumulator portion 90, lubricant gathers until it reaches a level that enables flow into a passage 92 that leads to the inner cavity 106.

The disclosed bearing assembly 120 includes rolling bearing elements 112 supported between an outer race 114 and an inner race 116. The rolling bearing elements 112 can be a ball, roller, tapered roller spherical roller element. Moreover, other bearing configurations and shapes as are known for use in a rolling element bearing assembly are within the contemplation of this disclosure. The rolling bearing elements 112 are spaced apart by a cage 118 disposed between the inner race 116 and the outer race 114. The inner race 116 includes guide rails 122 with a surface 124. The cage 118 moves along the surface 124 of the guide rails 122 during operation.

Lubricant is directed radially outward into a first passage 108 defined within the planet gear 64 and a second passage 110 defined in the inner race 116. Lubrication is communicated to the rolling bearing elements 112 through a third passage 104 between the internal cavity 106 and an outer radial surface of the planet gear 64. The third passage 104 is angled to direct lubricant onto the rolling bearing element 112.

Lubricant within the inner cavity 106 is driven radially outward by centrifugal forces into the first lubricant passage 108 through the planet gear 64 and in turn to the second lubricant passage 110 defined within the inner race 116. The second passage 110 extends through the guides 122 to the surface 124 interface with the cage 118. Lubricant works its way into a gap between the cage 118 and the surface 124. This gap closes under centrifugal load and acts like a journal bearing supporting the cage 118 under high load. Lubricant communicated to this interface prevents substantial wear at high loads.

Since the cage 118 is under high G load, the lubricant reduces frictional forces that may otherwise reduce operational life. The example cage 118 may be made from high durability materials including high-strength steels coated with silver, gold or nickel plate to further protect against wear. The guide rails 122 may also be coated with hard materials such as Titanium Nitride, Tungsten Carbide, Chrome or Chrome Carbide. Moreover, in one disclosed embodiment the surface 124 of the guide rails 122 may be formed to include a smooth finish of 16 micro-inches (0.4064 micrometer) or better. It should be understood that other materials and coatings that provide a desired durability and wear resistance are within the contemplation of this disclosure for any portion of the bearing assembly 120.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gear system for a turbofan engine assembly comprising:
    a sun gear rotatable about an engine centerline;
    a non-rotatable ring gear;
    a rotating carrier that drives a fan, the rotating carrier having a forward plate attached to an aft plate;
    a plurality of planet gears intermeshed between the sun gear and the ring gear;
    a rolling element bearing assembly for each of the plurality of planet gears, the rolling element bearing assembly supporting rotation of a corresponding one of the plurality of planet gears on the carrier, the rolling element bearing assembly includes a rolling element between an inner race and an outer race separated by a cage, wherein the inner race is supported on a radially outer surface of a corresponding one of the plurality of planet gears and includes guide rails that provide a surface to surface interface supporting the cage and the outer race is supported on a corresponding one of the forward plate and the aft plate;

a first passage for lubricant through each of the plurality of planet gears; and a second passage in communication with the first passage, the second passage extending through the inner race to the surface to surface interface between the inner race and the cage.

2. The gear system as recited in claim 1, wherein each of the plurality of planet gears includes an inner cavity and the first passage is in communication with the inner cavity and each of the plurality of planet gears further includes a third passage through each the plurality of planet gears that directs the lubricant toward the rolling element bearing assembly.

3. The gear system as recited in claim 2, wherein the carrier includes an outer scoop that rotates with the carrier receives the lubricant from an outer fixed lubricant jet, the outer fixed lubricant jet fixed relative to rotation of the carrier and is spaced axially apart from the carrier and feeds the lubricant into the inner cavity and through the first passage, the second passage and the third passage to provide the lubricant to the rolling element bearing assembly.

4. The gear system as recited in claim 3, wherein the carrier includes an inner scoop that rotates with the carrier and receives the lubricant from an inner fixed lubricant jet, the inner fixed jet is fixed relative to rotation of the carrier, is spaced axially apart from the carrier and feeds the lubricant through the carrier to a spray bar, the spray bar spraying the lubricant into at least one gear interface between each of the plurality of planet gears, the sun gear and the ring gear.

5. The gear system as recited in claim 1, wherein the rolling element bearing assembly is one of a ball, roller, tapered roller and spherical roller element.

6. The gear system as recited in claim 1, wherein the cage comprises at least one of a steel and a steel alloy.

7. The gear system as recited in claim 1, wherein the cage is plated with at least one of silver, nickel and gold.

8. The gear system as recited in claim 1, wherein the guide rails are coated with at least one of Tungsten Carbide, Titanium Nitride, Chrome and Chrome Carbide alloy.

9. The gear system as recited in claim 1, wherein surfaces of the surface to surface interface between the guide rails and the cage include a surface finish less than or equal to 16 micro-inches.

10. A geared turbofan engine comprising:

a fan configured to drive air along a bypass flow path;

a compressor section configured to communicate compressed air to a combustor section for generating a high energy gas flow for driving a turbine section where energy is extracted and utilized to drive the compressor section and the fan; and a gear system driven by the turbine section for driving the fan, the gear system including a sun gear rotatable about an engine centerline, a non-rotatable ring gear, a rotating carrier that drives the fan, a plurality of planet gears intermeshed between the sun gear and the ring gear, a rolling element bearing assembly corresponding with each of the plurality of planet gears and supporting rotation of a corresponding one the plurality of planet gears on the carrier, wherein the rolling element bearing assembly includes a rolling element between an inner race and an outer race separated by a cage, the inner race is disposed on a radially outermost surface of a corresponding one of the plurality of planet gears and includes guide rails that provide a surface to surface interface supporting the cage, the outer race is supported on the rotating carrier, a first passage extends through each of the plurality of planet gears, and a second passage extends through the inner race communicate lubricant to an interface between a surface of the guide rails of the inner race and a surface of the cage.

11. The geared turbofan engine as recited in claim 10, wherein each of the plurality of planet gears includes an inner cavity with the first passage in communication with the inner cavity and each of the plurality of planet gears further includes a third passage through each of the plurality of planet gears for directing the lubricant toward the rolling element bearing assembly.

12. The geared turbofan engine as recited in claim 11, wherein the carrier includes an outer scoop that receives the lubricant from an outer fixed lubricant jet and feeds the lubricant into the inner cavity and through the first passage, the second passage and the third passage to provide the lubricant to the rolling element bearing assembly.

13. The geared turbofan engine as recited in claim 12, wherein the carrier includes an inner scoop that receives the lubricant from an inner fixed lubricant jet and feeds the lubricant through the carrier to a spray bar, the spray bar spraying the lubricant into at least one gear interface between the plurality of planet gears, the sun gear and the ring gear.

14. The geared turbofan engine as recited in claim 10, wherein the guide rails coated with at least one of Tungsten Carbide, Titanium Nitride, Chrome and Chrome Carbide alloy.

15. The geared turbofan engine as recited in claim 10, wherein the surface of the guide rails and the surface of the cage includes a surface finish of less than or equal to sixteen (16) micro-inches.

* * * * *